US006272587B1

(12) United States Patent
Irons (10) Patent No.: US 6,272,587 B1
(45) Date of Patent: Aug. 7, 2001

(54) METHOD AND APPARATUS FOR TRANSFER OF DATA BETWEEN CACHE AND FLASH MEMORY IN AN INTERNAL COMBUSTION ENGINE CONTROL SYSTEM

(75) Inventor: John M. Irons, Greenwood, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/310,283

(22) Filed: May 12, 1999

Related U.S. Application Data (63) Continuation of application No. 08/723,525, filed on Sep. 30, 1996, now abandoned.

(51) Int. Cl.[7] ........................................ G06F 12/16
(52) U.S. Cl. ..................... 711/103; 711/162; 711/143
(58) Field of Search .................... 711/103, 118, 711/1, 3, 143, 162; 365/185.03, 229; 713/502; 714/6

(56) References Cited

U.S. PATENT DOCUMENTS

| | | | |
|---|---|---|---|
| 4,298,929 | 11/1981 | Capozzi | 711/201 |
| 4,779,193 | 10/1988 | Koga et al. . | |
| 4,853,848 | 8/1989 | Mitsuhashi et al. | 711/118 |
| 5,127,097 | 6/1992 | Mizuta | 711/168 |
| 5,297,148 | 3/1994 | Harari et al. . | |
| 5,359,569 * | 10/1994 | Fujita et al. | 365/229 |
| 5,406,529 | 4/1995 | Asano | 365/230.03 |
| 5,418,752 | 5/1995 | Harari et al. | 365/218 |
| 5,442,768 | 8/1995 | Sudoh et al. | 711/103 |
| 5,488,711 | 1/1996 | Hewitt et al. | 711/103 |
| 5,515,333 | 5/1996 | Fujita et al. | 365/229 |
| 5,535,328 * | 7/1996 | Harari et al. | 714/7 |
| 5,586,291 | 12/1996 | Lasker et al. | 711/113 |
| 5,592,616 | 1/1997 | Finch et al. . | |
| 5,696,929 * | 12/1997 | Hasbun et al. | 711/103 |
| 5,726,937 * | 3/1998 | Beard | 365/185.33 |
| 5,787,445 * | 7/1998 | Daberko | 707/205 |
| 5,999,446 * | 12/1999 | Harari et al. | 365/185.03 |
| 6,026,027 * | 2/2000 | Terrell, II et al. | 365/185.33 |

FOREIGN PATENT DOCUMENTS

0619541 A2 10/1994 (EP) .

OTHER PUBLICATIONS

Wu, M. et al., "Envy: A Non–Volatile, Main Memory Storage System," ACM Sigplan Notices, vol. 29, No. 11, Nov. 1, 1994, pp. 86–97, XP000491727

* cited by examiner

*Primary Examiner*—B. James Peikari
(74) *Attorney, Agent, or Firm*—Woodard, Emhardt, Naughton, Moriarty & McNett

(57) ABSTRACT

In a microprocessor-based automotive control system including flash memory and a RAM cache sized substantially smaller than the storage capacity of the flash memory, a caching technique is operable, in accordance with one aspect of the invention, to move areas of the flash memory into and out of the cache. The flash memory is updated by the contents of the cache each time the a new access is attempted to an area of flash memory or after a predefined time period has elapsed since such an access has been attempted. In accordance with another aspect of the invention, 9 bit storage within the flash memory is disallowed and only word (16 bit) or longword (32 bit) storage is allowed therein, so that the flash memory is addressable only on even boundaries thereof. A software algorithm is operable to modify a request for access to an odd flash memory address so that the request properly points to an address of the cache that contains the actual data of interest.

8 Claims, 5 Drawing Sheets

METHOD AND APPARATUS FOR TRANSFER OF DATA BETWEEN CACHE AND FLASH MEMORY IN AN INTERNAL COMBUSTION ENGINE CONTROL SYSTEM

REFERENCE TO RELATED APPLICATION

This application is a continuation of U.S. patent application Ser. No. 08/723,525, filed Sep. 30, 1996, and entitled: "Apparatus and Method for Accessing Flash Memory During Engine Operation", now abandoned.

FIELD OF THE INVENTION

The present invention relates generally to techniques for accessing flash memory, and more specifically for doing so during operation of an internal combustion engine wherein the flash memory forms part of an automotive engine control system.

BACKGROUND OF THE INVENTION

Computer-based control systems have been widely used in the automotive industry to control various vehicular functions including those associated with the internal combustion engine, vehicle drivetrain and other vehicle operating systems. A typical automotive control system is microprocessor-based and is often referred to as an engine control module (ECM), powertrain control module (PCM), engine control computer (ECC) or the like.

Automotive control systems of the foregoing type typically manage engine and vehicle operation via software algorithms resident in memory. Such algorithms generally fall into two categories: (1) vehicle operational algorithms, and (2) vehicle diagnostics algorithms. Vehicle operational algorithms are often carried out in accordance with calibration data stored in memory. Vehicle diagnostics algorithms, on the other hand, typically require access to memory for retrieval of known or expected vehicle operational parameters and for storage of diagnostics information relating to vehicle operation.

Automotive control systems of the type described hereinabove must therefore be equipped with sufficient memory for storing at least the operational and diagnostics algorithms, the vehicle calibration data and the vehicle diagnostics information. Such memory typically includes both volatile and non-volatile memory components which may take the form of random access memory (RAM) and any of a variety of read only memories (ROM) such as, for example, UV erasable programmable read only memory (EPROM), electrically erasable programmable read only memory (EEPROM), and the like.

In recent years, many automotive control systems have replaced one or more of the foregoing memory units with one or more flash memory units which have desirable properties of both volatile and non-volatile memories. For example, flash memories offer long term reliable storage of data therein, yet permit relatively simple reprogramming thereof, typically in the form of block erasures and writes.

As with many large capacity storage mediums, access to large capacity flash memories can be relatively slow, and access speed can be greatly improved by using a faster memory unit, such as RAM, to temporarily store data resident in flash. During system operation, data is more quickly accessed via RAM, and the RAM contents are typically copied back to flash memory for permanent storage prior to system shut down. In the automotive industry, such a scheme has typically involved the use of a so-called shadow RAM which has a capacity approximately equal to that of the flash memory. In operation, access to data contained within the flash memory is accomplished by accessing a copy of the data via the faster shadow RAM. The modified contents of the shadow RAM are then copied back to the flash memory just prior to shut down of the system.

The shadow RAM approach, while widely used, has several drawbacks associated therewith. For example, flash memory is typically not updated by the contents of the shadow RAM until system shutdown, so that a potentially large amount of data may have been modified by that time. If the correspondingly lengthy flash memory updating procedure is interrupted for some reason, valuable data may be lost. Further, as the need for additional flash memory capacity increases, the capacity of shadow RAM must likewise increase. At some point, the cost of additional shadow RAM, both monetarily and in terms of physical space consumption, cannot be justified.

As an alternative to the shadow RAM approach used in some automotive control systems, it is known in the computer art to use cache memory to speed up the performance of systems having slower access devices. Typically, part of a RAM is used as a cache for temporarily holding the most recently accessed data from the slower storage device. Thus, while the slower storage device may have a large storage capacity, a much smaller RAM, or portion of a RAM, may be used as the data access cache. This scheme works well in situations where the same data is repeatedly operated on, which is often the case with typical software architectures.

While the foregoing caching technique may solve the problem associated with the storage capacity required of the RAM, it has other drawbacks associated therewith. For example, most conventional cache designs are read caches for speeding up reads from the slower access memory device. While write caches have been used, data is typically written to the slower access storage device at the same time it is written to the write cache due to the concern for loss of updated data files in case of power loss. In an automotive engine control system, a flash memory could therefore not be updated during engine operation due to the long write times associated with the updating operation. In such systems, RAM caches are therefore typically not used, and larger RAM devices are required which write data back to flash memory only after engine operation ceases.

As another example, while typical flash memories are addressable on either even or odd boundaries when operating in a byte access mode (8 bit data items), such memories are addressable only on even boundaries when operating in word or long word access modes (16 or 32 bit data items respectively). Thus, in an automotive engine control system operating strictly in a word/long word access mode, operating system commands attempting to access odd flash memory addresses will generate address errors so that processing of such instructions cannot be carried out in accordance with conventional techniques.

In an automotive control system, what is therefore needed is a caching technique operable to move areas of flash memory into and out of a substantially smaller capacity RAM cache, wherein any particular flash area is updated by the modified contents of the RAM cache either periodically or when the cache is reloaded with a new flash area. Since typical flash memories are only addressable on even boundaries during word/long word access modes of operation, such a caching technique should further include provisions for disallowing byte access operation and for modifying odd memory access addresses generated by the operating system operating in word/long word access mode so that such addresses properly map to an appropriate flash address within the cache.

SUMMARY OF THE INVENTION

The foregoing shortcomings of prior art systems are overcome with the present invention. In accordance with one aspect of the present invention, a method of accessing flash memory comprises the steps of: providing an auxiliary memory having substantially faster access speed than the flash memory and defining a portion thereof as a cache having substantially smaller data storage capacity than the flash memory, copying data stored in a first area of the flash memory into the auxiliary memory cache, operating on any of the copied data in the auxiliary memory cache, and writing the operated on data in the auxiliary memory cache back into the first area of the flash memory after a predefined time period has elapsed since the copying step and in response to attempting access to flash memory data not presently contained within the auxiliary memory cache.

In accordance with another aspect of the present invention, a control system having a processor connected to a flash memory and to an auxiliary memory includes a method of accessing flash memory, wherein the method comprises the steps of providing the processor with an instruction requiring access to data contained within an address of the flash memory, processing the instruction and operating on the data contained within the address of the flash memory if the instruction requires access to an even address of the flash memory, and performing the following steps if the instruction requires access to an odd address of the flash memory. A first step includes ensuring that the data contained within the odd address of the flash memory is further contained within an address of the auxiliary memory, and a second step includes processing the instruction and operating on the data contained within the address of the auxiliary memory after mapping the odd address of the flash memory requiring access by the instruction to the address of the auxiliary memory.

In accordance with a further aspect of the present invention, an automotive electronic control system comprises a flash memory unit, an auxiliary memory unit defining a portion thereof as a cache having substantially smaller data storage capacity than the flash memory unit, and a processor having means for copying data stored in a first area of the flash memory unit into the cache of the auxiliary memory unit and means for writing data in the cache of said auxiliary memory unit back into the first area of the flash memory unit after one of a predefined time period has elapsed since copying data from the first area of the flash memory unit into the cache of the auxiliary memory unit and an attempt to access flash memory data not currently contained within the cache of the auxiliary memory unit.

In accordance with yet another aspect of the present invention, an automotive electronic control system comprises a flash memory unit accessible only at even addresses thereof, an auxiliary memory unit defining a portion thereof as a cache having substantially smaller data storage capacity than the flash memory unit, and a processor having means for processing an instruction requiring access to data contained within an address of the flash memory unit. The processor is operable to process the instruction and operate on the data contained within the address of the flash memory unit if the instruction requires access to an even address thereof. The processor is also operable to ensure that the data contained within the address of the flash memory unit is further contained within an address of the cache and then operate on the data contained within the address of the cache after mapping the address of the flash memory requiring access by the instruction to the address of the cache if the instruction requires access to an odd address of the flash memory unit.

One object of the present invention is to provide a data cache sized substantially smaller than a flash memory and operable to contain data from any designated area of the flash memory, wherein data contained within the cache is written back to the flash memory either prior to copying a new area of the flash memory into the cache, or after the data within the cache has remained there for a predefined time period.

Another object of the present invention is to provide a technique for accessing data contained within flash memory by first caching an address range of flash memory data and processing an instruction requiring the cached data, wherein the data in the cache is directly operated on if the instruction requires access to an even memory address and the memory address required by the instruction is modified to point to the actual address of the data within the cache if the instruction requires access to an odd memory address.

These and other objects of the present invention will become more apparent from the following description of the preferred embodiment.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 1:
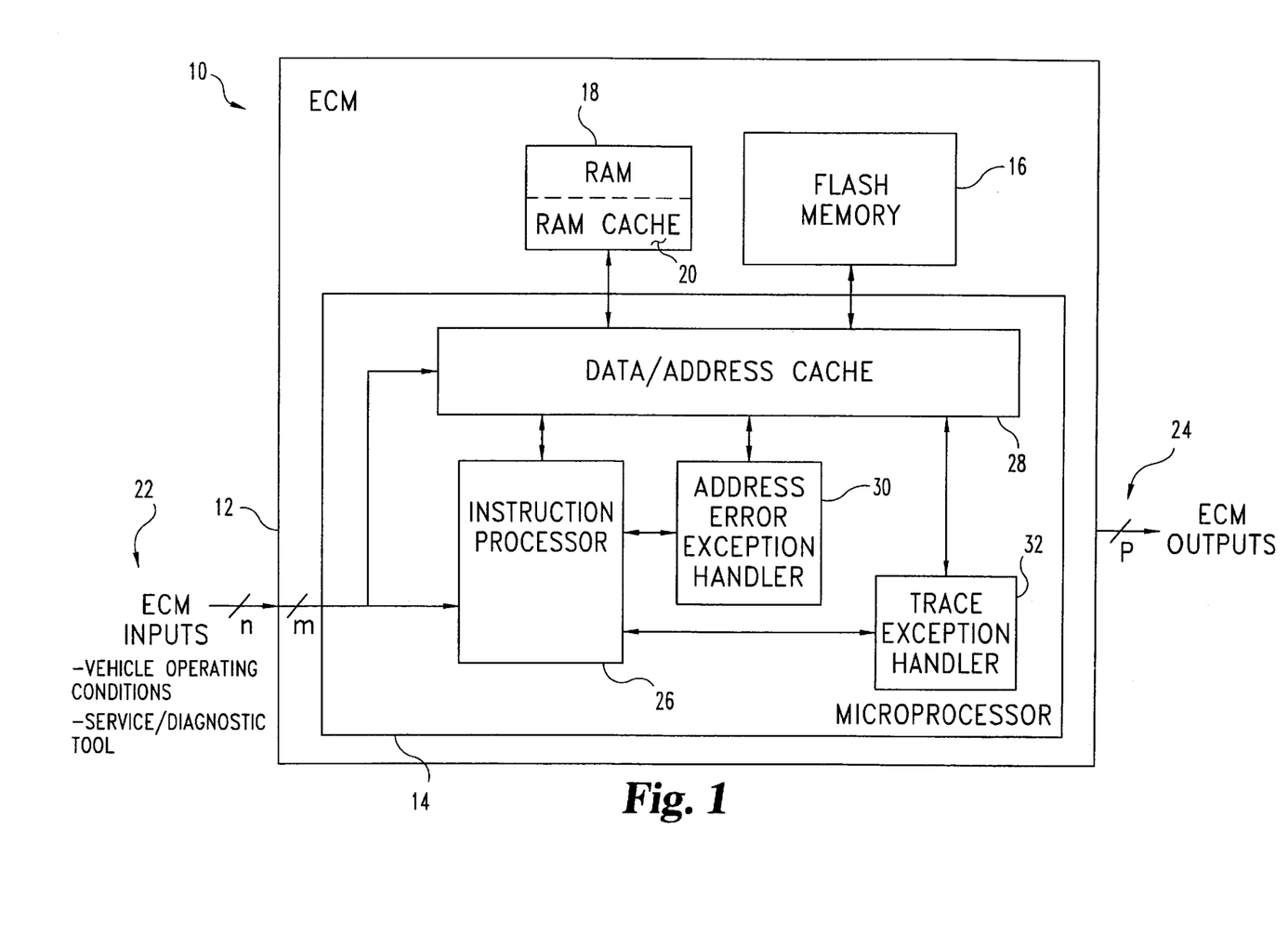
FIG. 1 is a diagrammatic illustration of one embodiment of a control system for accessing flash memory during engine operation, in accordance with one aspect of the present invention.

Referring now to FIG. 1, an automotive engine control system 10, in accordance with one aspect of the present invention, is shown. Preferably, automotive engine control system 10 includes an engine control module 12 (ECM), or equivalent as described in the BACKGROUND section, although the present invention contemplates that system 10 may include any processor-based automotive control system operable to access flash memory.

Automotive ECM 12 includes a microprocessor 14 connected to a flash memory unit 16 and to a random access memory (RAM) unit 18 as is known in the art. A portion of RAM unit 18 defines a RAM cache 20 which is preferably substantially smaller in data storage capacity than flash memory unit 16. In a preferred embodiment, RAM cache 20 constitutes a relatively small portion of a larger RAM unit 18 as shown in FIG. 1, although the present invention contemplates that RAM cache 20 may require a larger portion of RAM unit 18, or even require the totality of data storage space of RAM unit 18. In any case, RAM unit 18 may be any of a variety of known and commercially available RAM units.

ECM 12 is preferably configured to receive a number, n, of ECM inputs 22 including, for example, those corresponding to vehicle operating conditions, including diagnostic data, and those corresponding to programming information provided by a service or diagnostic tool. The number n may be any integer value. While some of the n inputs may be directed to ECM sub-systems not shown in FIG. 1, a number, m, of the n inputs are fed into microprocessor 14. Preferably, m is less than or equal to n. ECM 12 is further preferably configured to provide a number, p, outputs 24 to other vehicle systems and components, wherein p may be any integer value.

Microprocessor 14 preferably includes an instruction processor 26, a data/address cache 28, and address error exception handler 30 and a trace exception handler 32. The m inputs to microprocessor 14 are provided to the instruction processor 26 and to the data/address cache 28. The data/address cache 28 is further connected to each of the instruction processor 26, address error exception handler 30 and trace exception handler 32. The instruction processor 26 is further connected to each of the address error exception handler 30 and trace exception handler 32. Preferably, microprocessor 14 is a Motorola MC68331 microcontroller, although the present invention contemplates that microprocessor 14 may be any known microprocessor-based control computer capable of operation as described hereinafter.

While any of a variety of flash memory units may be provided as flash memory unit 16, a preferred flash memory unit is an Intel A28F400BX-T/B 4-Mbit boot block flash memory unit. As is typical of flash memories, flash memory unit 16 is addressable only on even boundaries thereof during word (16 bit data items) and long word (32 bit data items) access mode. For this reason, special provisions must be made for word/long word processor instructions that require access to odd memory addresses. Such provisions form an important aspect of the present invention and will be described in detail with respect to FIGS. 2–5.

Figure 2:
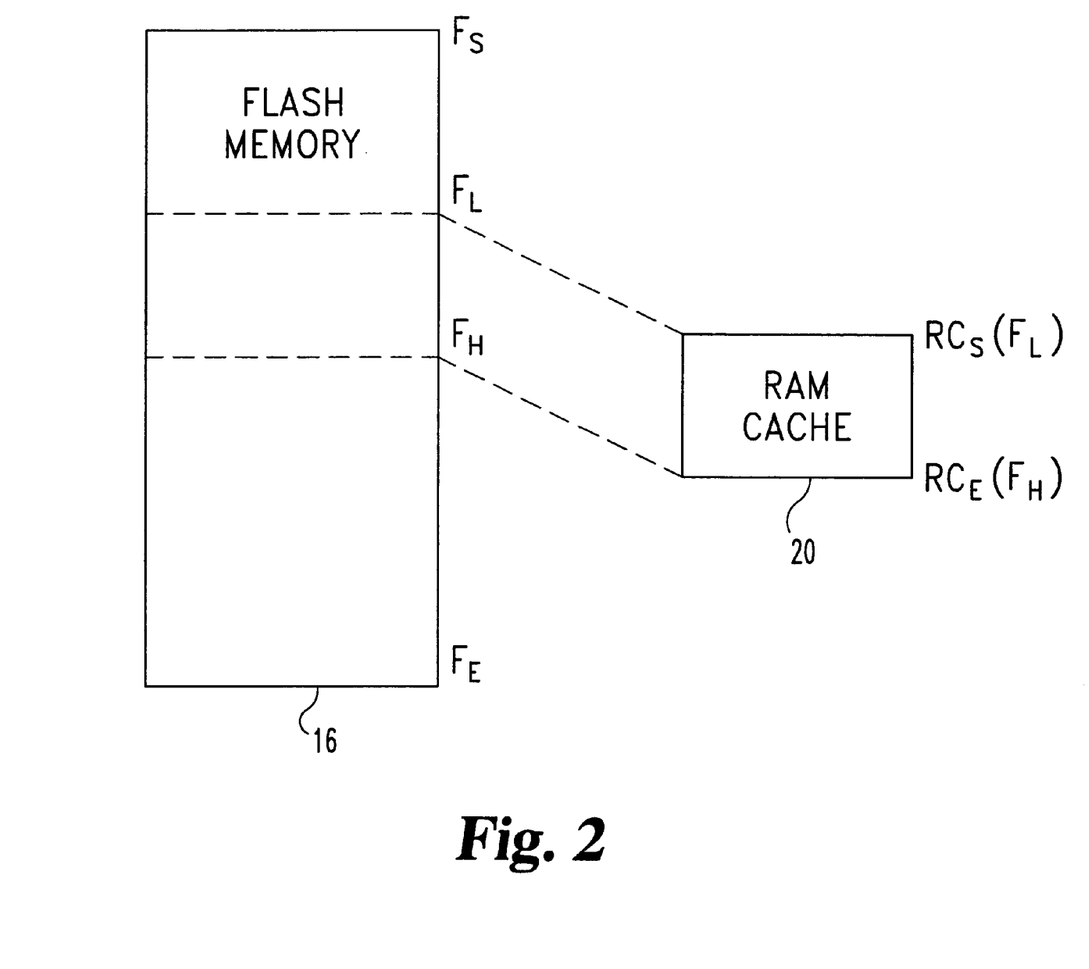
FIG. 2 is a block diagram illustrating a relationship between the flash memory and RAM cache components of FIG. 1.

Referring now to FIG. 2, a RAM caching technique, in accordance with another aspect of the present invention, is shown. Flash memory unit 16 is shown as having a starting address $F_S$ and and ending address $F_E$. Addresses between $F_S$ and $F_E$ define the storage capacity of flash memory unit 16. Similarly, RAM cache 20 is shown as having a starting address $RC_S$ and $RC_E$, wherein addresses between $RC_{S\ and}$ $RC_E$ define the storage capacity of cache 20. In accordance with the present invention, any arbitrary area of flash memory 16 may be copied into RAM cache 20. While any size area of flash memory 16 that corresponds to less than the storage capacity of cache 20 may be copied therein, a preferred data copying arrangement requires copying an area of data within flash memory unit 16 into cache 20 that is equal to the capacity of cache 20. Thus, the area of flash memory unit 16 defined between flash memory addresses $F_L$ and $F_H$ preferably contains enough data to completely fill RAM cache 20.

As will be more fully described hereinafter, microprocessor 14 is operable to move areas of flash memory unit 16 into and out of RAM cache 20 as data contained within different areas of flash memory 16 are needed. For this reason, the data storage capacity of RAM cache 20 is preferably small enough so that the copying of data contained between flash memory addresses $F_L$ and $F_H$ to RAM cache 20, as well as write operations of all data contained within RAM cache 20 to the flash memory area defined between $F_L$ and $F_H$, does not interrupt the operation of microprocessor 14 during engine operation.

In accordance with the present invention, byte access (8 bit data items) to flash memory unit 16 by system 10 is disallowed, and only words (16 bit data) and long words (32 bit data) may be stored in flash memory unit 16. As such, flash memory unit 16 is addressable only on even boundaries thereof. The present invention permits processing of instructions requiring access to an odd flash memory address by providing for an address mapping scheme that assigns odd addresses to all of the data contained within RAM cache 20 as will be discussed in detail hereinafter. If microprocessor 14 processes an instruction requiring access to an even memory address, it will access the data directly from/to flash memory unit 16. On the other hand, if microprocessor 14 processes an instruction requiring access to an odd memory address, it will first make sure that the required odd memory address resides within RAM cache 20, and then proceed to access the odd-addressed data from/to RAM cache 20. Periodically, the contents of RAM cache 20 will be written back to the corresponding even address locations of flash memory unit 16 to thereby update flash memory unit 16.

If an instruction executed by microprocessor 14 requires access to an odd flash memory address not contained within RAM cache 20, microprocessor 14, in accordance with the present invention, erases the old (unmodified) data contained between addresses $F_L$ and $F_H$ of flash memory 16 and writes the present area of modified data contained within RAM cache 20 therein. Once the modified data has been successfully written back into the flash memory unit 16 from where it originated (between $F_L$ and $F_H$), a new area of flash memory data containing the data needed by the instruction being executed is copied into RAM cache 20 as previously discussed, wherein the new area of flash memory is preferably equal in size to the capacity of RAM cache 20. In order to keep track of the flash memory area contained within RAM cache 20, the data within each address of RAM cache 20 contains an indication of the flash memory address corresponding thereto. Thus, as shown by example in parenthesis near RAM cache 20, the starting RAM cache address $RC_S$ has flash memory address $F_L$ associated therewith, and the ending RAM cache address $RC_E$ has flash memory address $F_H$ associated therewith.

From the foregoing, it should now be appreciated that flash memory unit 16 is "updated", i.e. the contents of RAM cache 20 are written thereto, each time an instruction executed by microprocessor 14 requires flash memory data not currently contained within RAM cache 20. However, the present invention recognizes that there will likely be times in the operation of ECM 12 that the data within RAM cache 20 may not change for extended periods of time. In order to reduce the risk of data loss, the microprocessor 14 is therefore operable to automatically write the contents of RAM cache 20 to the corresponding flash memory area if the contents of RAM cache 20 have not changed for a predefined time period since copying the latest set of data thereto. Preferably, the predefined time period is set at approximately 24 hours, although the present invention contemplates that the predefined time period may be any time period that is less than or equal to a time period for which the vehicle may be expected to be in continuous operation.

As described hereinabove, flash memory unit 16 is, in accordance with the present invention, addressable only on even boundaries thereof so that only words and long words may be stored therein. On the other hand, a typical RAM, such as RAM cache 20, includes a sequential series of even and odd addresses as is known in the art. Thus, in order to properly map an instruction which requests access to an odd flash memory address to a corresponding RAM cache address, provisions must be made to offset the RAM cache address by one address location after the flash memory address is converted to a RAM cache address.

Figure 3:
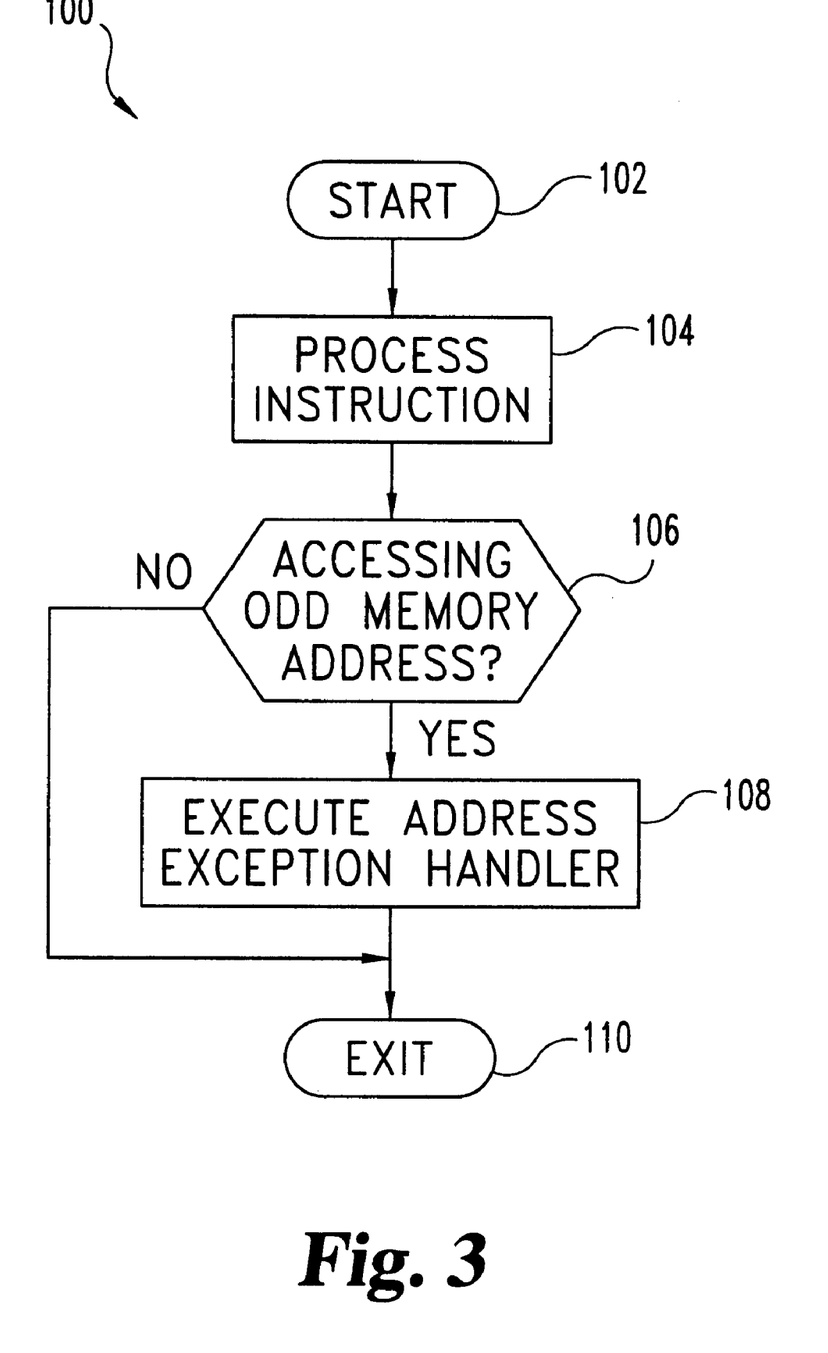
FIG. 3 is a flow chart illustrating one embodiment of a software algorithm for managing access to the flash memory within the control system of FIG. 1, in accordance with another aspect of the present invention.

Referring to FIG. 3, one embodiment of a software algorithm 100 for processing instructions requesting access to word or long word data resident in flash memory unit 16, is shown. As previously discussed, the present invention does not allow 8 bit data to be stored within flash memory unit 16, thereby eliminating any chance of byte access thereto. It is to be understood that algorithm 100 is executed only when instructed to access a flash memory address, and bypasses algorithm 100 when not attempting to access a flash memory address. Algorithm 100, which is executable by microprocessor 14, begins at step 102, and at step 104, microprocessor 14 begins to process an instruction. Thereafter at step 106, processor 14 determines, in accordance with known techniques, whether the instruction requires access to an even or an odd address. If microprocessor 14 determines at step 106 that the instruction requires access to an odd address, microprocessor 14 turns control over to the address error exception handler 30 (FIG. 1) at step 108 which executes an address exception handler routine before exiting at step 110. If, however, microprocessor 14 determines at step 106 that the instruction requires access to an even flash memory location, then microprocessor 14 processes the instruction and accesses the word or long word directly from/to flash memory unit 16. By requiring the data stored within flash memory unit 16 to be either word (16 bit) or long word (32 bit) length, and by accessing flash memory unit 16 directly only when executing instructions requiring access to even flash memory addresses, access time from/to flash memory unit 16 is typically fast enough so that the operating speed of microprocessor 14 is not significantly affected.

Figure 4:
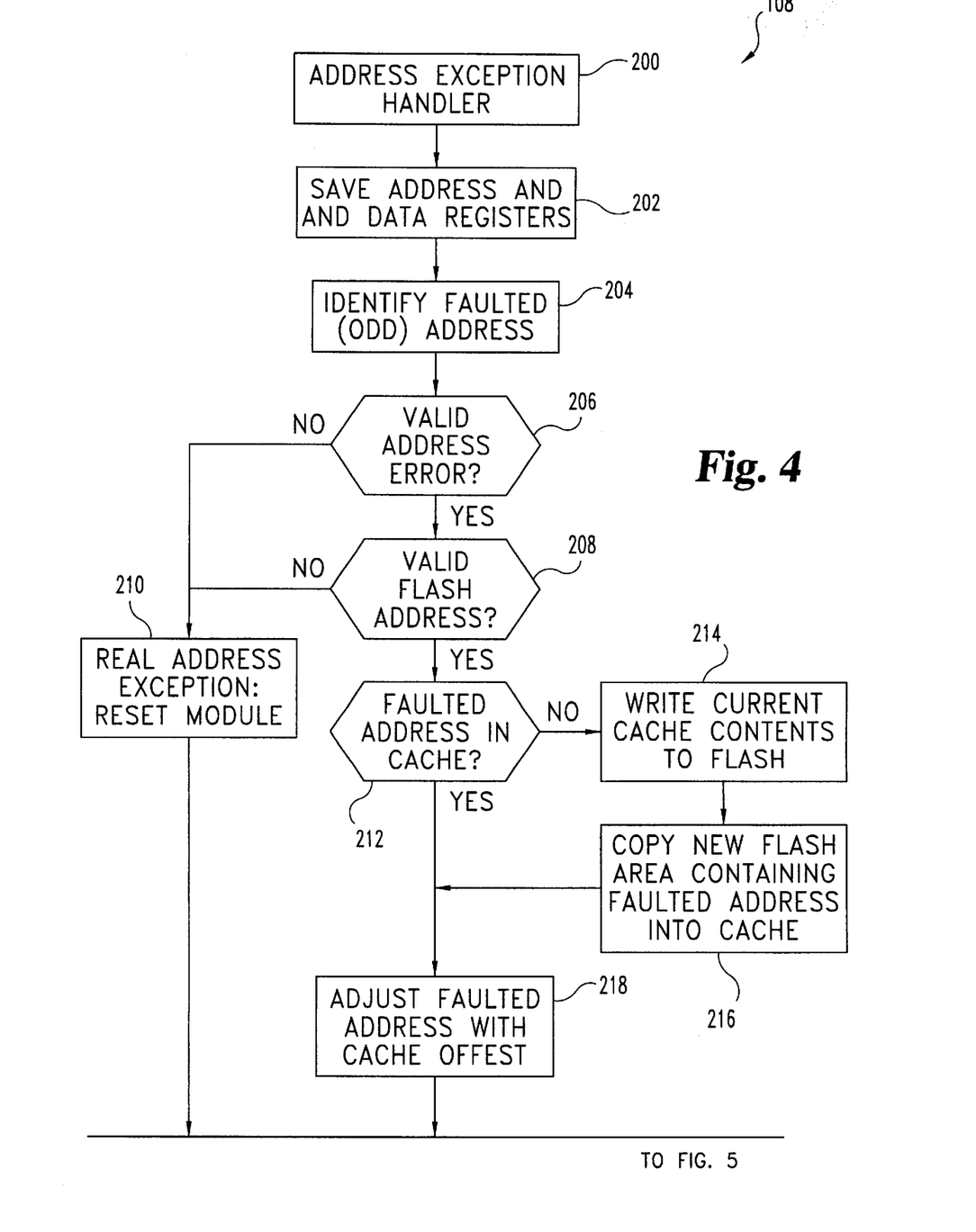
FIG. 4 is a flow chart illustrating one embodiment of a software algorithm for handling requests for access to odd flash memory addresses within the control system of FIG. 1, in accordance with yet another aspect of the present invention.
Figure 5:
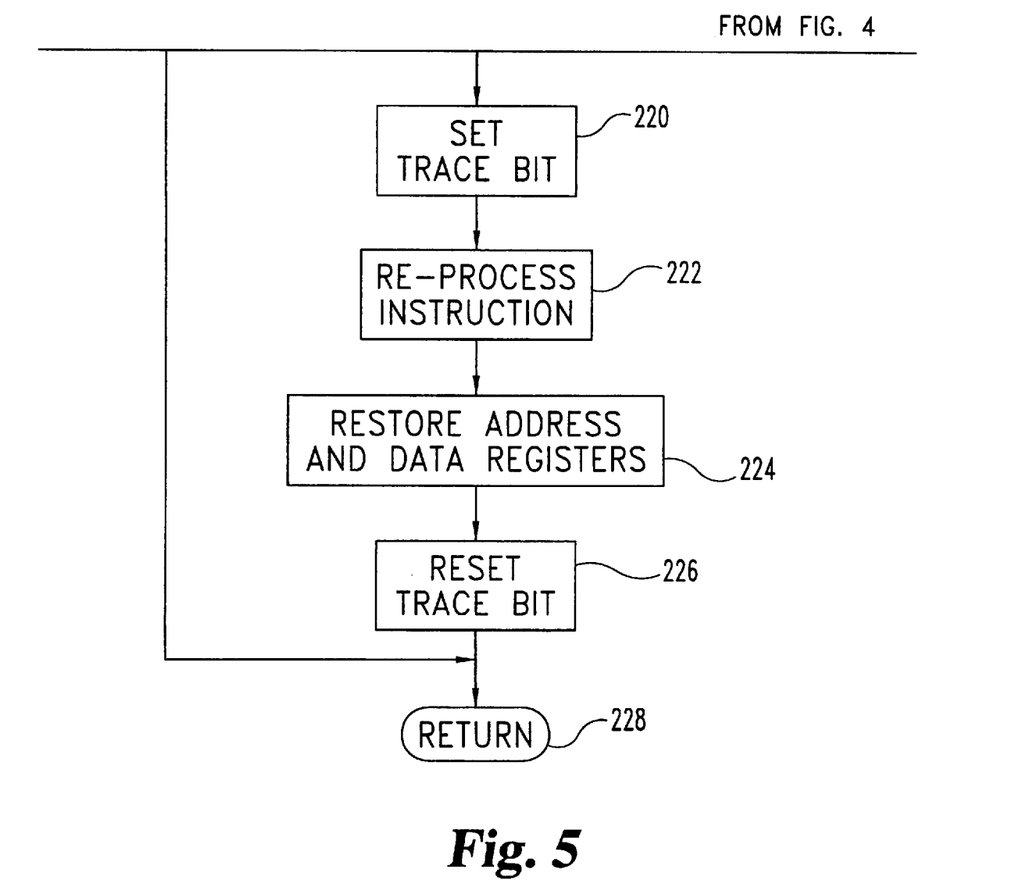
FIG. 5 is a continuation of the flow chart of FIG. 4.

Referring now to FIGS. 4 and 5, one preferred embodiment of an address exception handler algorithm for performing step 108 of algorithm 100, is shown. In accordance with the present invention, any attempt by microprocessor 14 to access an odd flash memory address generates an address error, to which microprocessor 14 is responsive to turn control over to the address error exception handler 30. The address exception handler algorithm begins at step 200, and at step 202, address error exception handler 30 saves the contents of all address and data registers of microprocessor 14 that were in use prior to turning control over to handler 30. Thereafter at step 204 handler 30 is operable to identify the faulted, or odd, flash memory address which triggered operation of handler 30.

In one embodiment of the present invention, there exists only a few (preferably 5) instructions that require a read or write to a flash memory address. Handler 30 is thus operable at step 204 to inspect a set of data registers within microprocessor 14 to determine whether one of the few instructions was being processed by microprocessor 14. If so, the data within the corresponding data register is decoded to determine the odd flash memory address to which the instruction requested access. If, on the other hand, handler 30 determines that the request for access to the odd flash memory address was not instruction generated, handler 30 proceeds to inspect a number of address registers within microprocessor 14 which may be used by algorithm 100. In one embodiment there are four such address registers. If any of the four address registers contains an odd address, then the odd address contained therein is determined to be the flash memory address to which access was requested.

From step 204, algorithm execution advances to step 206 where handler 30 determines whether the address error generated by a request for access to an odd flash memory address is a valid address error. If the search in step 204 for the odd address indicates that it was not instruction generated, and none of the four microprocessor address registers is found to contain an odd address, then handler 30 assumes a real address exception and advances from step 206 to step 210 where ECM 12 is reset. Algorithm execution continues from step 210 at step 228 where algorithm control is returned to algorithm 100. If, however, the search in step 204 determines that the odd address was instruction generated or is contained in one of the four microprocessor address registers, algorithm execution advances to step 208.

At step 208, handler 30 is in possession of an odd address and proceeds to determine whether this odd address is a valid address of flash memory 16. Preferably, step 208 is performed simply by determining if the odd address is within the range of between $F_S$ and $F_E$ (see FIG. 2). If not, handler 30 assumes a real address exception and algorithm execution advances to step 210. If, at step 208, handler 30 determines that the odd address is a valid address within flash memory 16, algorithm execution advances to step 212 where handler 30 determines whether the faulted, or odd, flash memory address identified in step 204 is currently contained within RAM cache 20.

At step 212, microprocessor 14 preferably checks the flash memory address associated with either the starting or ending RAM cache 20 address ($RC_S$ or $RC_E$, respectively). Knowing the size of RAM cache 20, microprocessor 14 can then easily compute the offset between the RAM cache 20 address and the corresponding flash memory 16 address to determine whether the faulted address is within the range of flash memory addresses currently contained within the RAM cache 20.

If, at step 212, the faulted address requested by the instruction is not contained within the RAM cache 20, algorithm execution advances to step 214 where the microprocessor 14 erases the area of data in flash memory 16 corresponding to that currently contained within RAM cache 20, and then writes the current contents of the RAM cache 20 into the erased area of flash memory 16, thereby updating flash memory 16 with modified data. Thereafter at step 216, microprocessor copies a new area of flash memory 16 into RAM cache 20 which contains the faulted address requested by the instruction. Preferably, the new area of flash memory 16 copied to RAM cache 20 is determined by subtracting 16 bytes from the faulted address, and defining the preceding even flash address as $F_L$ (see FIG. 2). $F_H$ is then defined as $F_L$ plus the size of the RAM cache 20. Data within addresses $F_L$ to $F_H$ are then copied into RAM cache 20 so that $RC_S$ corresponds to $F_L$ and $RC_E$ corresponds to $F_H$. It is to be understood that such a data copying scheme, while preferred in one embodiment of the present invention, should not be considered as limiting the present invention thereto. Those skilled in the art will recognize that a number of alternate techniques may be used to copy data from flash memory 16 into RAM cache 20, it being important only that at least the data corresponding to the flash memory address of interest (that contained in the faulted address) be copied to the RAM cache 20. In any case, algorithm execution advances from step 216, and from step 212 if handler 30 determines that the faulted address is currently contained within RAM cache 20, to step 218.

At step 218, handler 30 is operable to adjust the value of the faulted address within microprocessor 14 to point to the generated odd flash memory address plus or minus (preferably minus) one address location. By doing so, the faulted address within microprocessor 14 is changed to an even value which may then be properly mapped to an address location within RAM cache 20 that contains the actual data of interest. Handler 30 further subtracts one count from the program counter at step 218 so that the program counter now points to the instruction that triggered operation of the address error exception handler 30. Thereafter at step 220, handler 30 sets a trace bit.

Thereafter at step 222, the instruction that caused the address error is re-processed. However, since the faulted flash memory address which caused the address error has been modified to point to the proper RAM cache address, re-processing of the instruction does not cause an address error, but rather operates on the data contained within the proper RAM cache address in accordance with the particular instruction. Each time an instruction is process, the trace bit is inspected by microprocessor 14 to determine whether it has been set. If not, then microprocessor 14 carries on as described hereinabove. If, however, microprocessor 14 (or handler 30) determines that the trace bit has been set, algorithm control is turned over to the trace exception handler 32 (see FIG. 1). Under control of the trace exception handler 32, microprocessor 14 is operable to advance from step 222 to step 224 where the contents of the previously stored address and data registers (step 202 of FIG. 4) are restored. It is necessary to restore the registers to their original state after the instruction of step 104 is properly executed so that this instruction will again trigger an address error, and be properly dealt with, if executed in the future. From step 224, algorithm execution advances to step 226 where the trace bit is reset and control of microprocessor 14 is returned to the instruction processor 26. Algorithm execution continues therefrom at step 228 where algorithm control is returned to algorithm 100 of FIG. 3.

From the foregoing, it should now be appreciated that the present invention is operable to move areas of data in flash memory unit 16 into and out of RAM cache 20 as data in such areas are required in accordance with instructions processed by microprocessor 14. Since only word (16 bit) and long word (32 bit) data are permitted to be stored within flash memory unit 16, flash memory unit 16 is addressable only on even boundaries thereof. To permit odd memory address access, microprocessor 14 is operable to odd align all corresponding data stored within RAM cache 20. This is accomplished by mapping all flash memory addresses contained within RAM cache 20 to corresponding odd addresses for access by instructions requiring access thereto.

In cases where an instruction processed by microprocessor 14 requires access to an even flash memory address, data is retrieved from, operated upon, and/or stored within, the flash memory unit 16 directly. On the other hand, when such an instruction requires access to an odd flash memory address, data is retrieved from, operated upon, and/or stored within RAM cache 20 which contains the odd-aligned data. Data from RAM cache 20 is written back to the appropriate areas of flash memory unit 16 either just prior to copying a new area of flash memory unit 16 therein, or periodically if no such new area is copied therein within a predetermined time period since the previous copy.

The present invention provides a reliable scheme for accessing and updating word and long word data from flash memory during operation of an internal combustion engine. Since only word and long word access is permitted, and since flash memory unit 16 is directly accessed only for instructions requiring even addressed data, access time to/from flash memory unit 16 is typically fast enough so as not to significantly affect the processing speed of microprocessor 14. Further, since RAM cache 20 contains only a relatively small amount of data, updating of flash memory unit 16 thereby similarly does not significantly affect the processing speed of microprocessor 14. Data within flash memory unit 16 can, in accordance with the present invention, therefore be updated during engine operation rather than only prior to engine shutdown as in prior art systems.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of accessing flash memory in an internal combustion engine control system, said method comprising the steps of:

providing an auxiliary memory cache having substantially faster access speed than the flash memory and substantially smaller data storage capacity than the flash memory;

copying data stored in a first area of the flash memory into said auxiliary memory cache;

operating on any of said copied data in said auxiliary memory cache; and writing said operated on data in said auxiliary memory cache back into said first area of the flash memory, in response to either of two conditions: (a) the passage of a predetermined time period of approximately twenty-four hours since the copying step, or (b) an attempted read or write access to an area of the flash memory containing flash memory data not presently contained within said auxiliary memory cache, whichever occurs first.

2. The method of claim 1 wherein the data storage capacity of said auxiliary memory cache is equal to the amount of data stored in said first area of the flash memory.

3. The method of claim 1 wherein said first area of the flash memory includes a number of data entries each having a flash memory address associated therewith.

4. The method of claim 3 wherein said auxiliary memory cache includes a corresponding number of data entries after completion of the copying step, each of said cache data entries having a cache address and corresponding flash memory address associated therewith.

5. An automotive electronic control system comprising:

a flash memory unit;

a cache having substantially smaller data storage capacity than said flash memory unit; and a processor having means for copying data stored in a first area of said flash memory unit into said cache and means for writing data in said cache back into said first area of said flash memory unit, in response to either of two conditions: (a) the passage of a predetermined time period of approximately twenty-four hours since the copying step, or (b) an attempted read from or write to an area of the flash memory unit containing flash memory data not currently contained within said cache, whichever occurs first.

6. The system of claim 5 wherein the data storage capacity of said cache is equal to the amount of data stored in said first area of said flash memory unit.

7. The system of claim 5 wherein said first area of said flash memory unit includes a number of data entries each having a flash memory address associated therewith.

8. The system of claim 7 wherein said cache includes a number of data entries identical to said number of data entries in said flash memory unit, each of said number of data entries in said cache having a cache address and corresponding flash memory address associated therewith.

* * * * *